United States Patent
Schmidlin et al.

(10) Patent No.: US 11,448,410 B2
(45) Date of Patent: Sep. 20, 2022

(54) METHOD OF MONITORING AN AIR FLOW IN A ZONE OF AN HVAC SYSTEM

(71) Applicant: BELIMO HOLDING AG, Hinwil (CH)

(72) Inventors: Peter Schmidlin, Uster (CH); Frank Lehnert, Rüti (CH); Urs Niederhauser, Pfungen (CH); Marc Thuillard, Uetikon am See (CH)

(73) Assignee: BELIMO HOLDING AG, Hinwil (CH)

( * ) Notice: Subject to any disclaimer, the term of this patent is extended or adjusted under 35 U.S.C. 154(b) by 254 days.

(21) Appl. No.: 16/790,826

(22) Filed: Feb. 14, 2020

(65) Prior Publication Data

US 2020/0278129 A1    Sep. 3, 2020

(30) Foreign Application Priority Data

Mar. 1, 2019  (CH) ..................... 00251/19

(51) Int. Cl.
*F24F 11/38* (2018.01)
*F24F 11/74* (2018.01)
(Continued)

(52) U.S. Cl.
CPC .............. *F24F 11/38* (2018.01); *F24F 11/58* (2018.01); *F24F 11/64* (2018.01); *F24F 11/74* (2018.01);
(Continued)

(58) Field of Classification Search
CPC .. F24F 11/58; F24F 11/64; F24F 11/74; F24F 11/89; F24F 11/72; F24F 11/49;
(Continued)

(56) References Cited

U.S. PATENT DOCUMENTS

| | | |
|---|---|---|
| 5,705,734 A | 1/1998 | Ahmed |
| 6,219,590 B1 | 4/2001 | Bernaden, III et al. |

(Continued)

FOREIGN PATENT DOCUMENTS

| | | |
|---|---|---|
| CN | 1174965 A | 3/1998 |
| CN | 105026868 A | 11/2015 |

(Continued)

OTHER PUBLICATIONS

English Translation of Office Action dated Sep. 6, 2021 in Chinese Application No. 202010123047.2.

(Continued)

*Primary Examiner* — Santosh R Poudel
(74) *Attorney, Agent, or Firm* — Sughrue Mion, PLLC

(57) ABSTRACT

A method of monitoring an air flow in a zone (1) of an HVAC system (10) is described, the zone (1) comprising a supply port (11) and a return port (12), a first flow sensor (111) configured to measure a supply flow ($\phi_1$) through the supply port (11), and a second flow sensor (121) configured to measure a return flow ($\phi_2$) through the return port (12), the method comprising: recording by a control system (20, 20') the supply flow ($\phi_1$) measured by the first flow sensor (111) and the return flow ($\phi_2$) measured by the second flow sensor (121); determining by the control system (20, 20') an infiltration and exfiltration component ($\phi_{inf/exf}$), using the supply flow ($\phi_1$) and the return flow ($\phi_2$) recorded by the control system (20, 20'); and determining by the control system (20, 20') an operational sensor state of at least one of the first flow sensor (111) and the second flow sensor (121), using the supply flow ($\phi_1$), the return flow ($\phi_2$), and the infiltration and exfiltration component ($\phi_{inf/exf}$).

13 Claims, 5 Drawing Sheets

(51) Int. Cl.
   *F24F 11/64* (2018.01)
   *F24F 11/89* (2018.01)
   *F24F 11/58* (2018.01)
   *G05B 23/02* (2006.01)
   *F24F 110/40* (2018.01)

(52) U.S. Cl.
   CPC .......... *F24F 11/89* (2018.01); *G05B 23/0221* (2013.01); *F24F 2110/40* (2018.01)

(58) Field of Classification Search
   CPC .............. F24F 2110/30; F24F 2110/40; G05B 23/0221; G01F 25/0007; G01F 25/0053; G01F 25/00
   See application file for complete search history.

(56) References Cited

U.S. PATENT DOCUMENTS

| | | | |
|---|---|---|---|
| 6,553,827 B2 * | 4/2003 | McCormick | B23K 9/323 |
| | | | 73/196 |
| 9,784,703 B2 | 10/2017 | Budde | |
| 10,496,065 B2 | 12/2019 | Conley et al. | |
| 11,135,897 B2 | 10/2021 | Fischer et al. | |
| 2010/0280796 A1 * | 11/2010 | Ramin | H05K 7/20836 |
| | | | 702/188 |
| 2013/0282186 A1 * | 10/2013 | Douglas | G05D 23/00 |
| | | | 700/277 |
| 2014/0033753 A1 * | 2/2014 | Lu | F25B 49/02 |
| | | | 62/190 |
| 2014/0266755 A1 * | 9/2014 | Arensmeier | F24F 11/62 |
| | | | 340/679 |
| 2015/0338314 A1 * | 11/2015 | Meyer | G01M 3/2815 |
| | | | 73/40 |
| 2016/0103457 A1 | 4/2016 | Maughan et al. | |
| 2016/0245541 A1 | 8/2016 | Karamanos et al. | |
| 2017/0045255 A1 | 2/2017 | Karamanos et al. | |
| 2018/0283914 A1 * | 10/2018 | Sugita | G01F 1/50 |
| 2019/0170383 A1 * | 6/2019 | Weinert | F25B 49/005 |
| 2020/0285226 A1 * | 9/2020 | Chatterjee | G05B 23/0297 |

FOREIGN PATENT DOCUMENTS

| | | |
|---|---|---|
| CN | 107436014 A | 12/2017 |
| CN | 109130771 A | 1/2019 |
| WO | 2013/159458 A1 | 10/2013 |
| WO | 2014/105031 A2 | 7/2014 |

OTHER PUBLICATIONS

Swiss Search Report for Application CH 00251/2019 dated Jul. 2, 2019.

* cited by examiner

METHOD OF MONITORING AN AIR FLOW IN A ZONE OF AN HVAC SYSTEM

TECHNICAL FIELD

The invention relates to a method and a control system for monitoring an air flow in a zone of an HVAC system.

BACKGROUND OF THE INVENTION

In HVAC (Heating, Ventilation and Air Conditioning) systems, zoning of buildings such as residential homes, apartments, hotels, office buildings, schools etc. is often performed in order to increase the efficiency and precision in controlling the HVAC system. The zones typically consist of different spaces such as for example different rooms of a home or different areas of a large enclosed space such as an airport.

Typically, a zone has an inlet for the supply of an air flow and an outlet for the return of the air flow. Sensors are used to detect the air flow into and out of the respective zone. The zones are thereby controlled by using the information of the detected air flow and by using dampers to provide the amount of heating or cooling required.

A requirement in the art of controlling the zones of HVAC systems is the accuracy of the information on the air flow in the respective zones as detected by the sensors of a zone. Therefore, it is required that the sensors are in an operable condition and able to provide reliable information on the air flow in the zones of the HVAC system.

SUMMARY OF THE INVENTION

It is an object of the invention to provide a method and a control system for monitoring an air flow in a zone of an HVAC system, which at least partially improves the prior art.

According to the present invention, these objects are achieved by the features of the independent claims. In addition, further advantageous embodiments follow from the dependent claims and the description.

According to an aspect of the invention, the object is particularly achieved by a method of monitoring an air flow in a zone of an HVAC system, the zone comprising a supply port and a return port, a first flow sensor configured to measure a supply flow through the supply port, and a second flow sensor configured to measure a return flow through the return port, the method comprising: recording by a control system the supply flow measured by the first flow sensor and the return flow measured by the second flow sensor; determining by the control system an infiltration and exfiltration component, using the supply flow and the return flow recorded by the control system; and determining by the control system an operational sensor state of at least one of the first flow sensor and the second flow sensor, using the supply flow, the return flow, and the infiltration and exfiltration component.

In the context of the present invention, the terms "infiltration" and "exfiltration" shall be used as understood by the skilled person in the field of HVAC systems. In particular, "infiltration" shall be understood as the, especially unintentional and/or uncontrolled, flow of air from the outside of an enclosed space into the enclosed space. Infiltration can for example occur through cracks in a building and due to pressure differences between inside and outside. In some situations, outdoor air entering through open doors and/or windows is also considered as infiltration. "Exfiltration", in particular, shall be understood as the flow of the air from an enclosed space to the outside of the enclosed space which can occur due to similar reasons as for infiltration, but for opposite pressure differences between inside and outside.

In a situation with negligible (or without any) infiltration and exfiltration, the supply flow as measured by the first flow sensor and the return flow as measured by the second flow sensor would be equal, except for opposite signs, or in a constant relation to each other, provided the first and second flow sensors would operate ideally. Using the supply flow and the return flow, as recorded by the control system, an infiltration and exfiltration component can therefore be determined by the control system, if the supply flow and the return flow deviate from each other or from the constant relation to each other. For example, a deviation can occur from a fluctuating return flow due to infiltration and/or exfiltration. The control system can for example determine the deviation by forming a ratio between the supply flow and the return flow which should, in the absence of infiltration and exfiltration, amount to unity or to another specific value, with the ratio deviating from unity or from the specific value indicating an infiltration and exfiltration component being present.

Further, using the supply flow, the return flow, and the infiltration and exfiltration component, the operational state of at least one of the first flow sensor and the second flow sensor can be determined. In particular, the method allows to determine degradation of at least one of the first flow sensor and the second flow sensor, for example due to fouling, which typically leads to lower measured values of supply flow and/or return flow. The method thus provides the advantage that the operational sensor state can be monitored in-situ by the control system and that maintenance efforts due to on-site inspection can advantageously be reduced.

In an embodiment, determining the infiltration and exfiltration component comprises the control system detecting the infiltration and exfiltration component in a temporal course of the return flow recorded by the control system; and determining the operational sensor state comprises the control system removing the infiltration and exfiltration component from the temporal course of the return flow recorded by the control system.

The control system may monitor the air flow of the zone by recording the return flow over a period of time such that fluctuations in the return flow due to infiltration and/or exfiltration can be detected. In particular, infiltration and/or exfiltration can occur over a characteristic time scale which may be expressed in fluctuations in the temporal course of the return flow. The method therefore provides the advantage that changes in the air flow due to infiltration and/or exfiltration, which for example do not occur instantaneously, can be detected by recording the temporal course of the return flow as measured by the second flow sensor. Further, the infiltration and exfiltration component, as determined by the control system, can be removed from the temporal course of the return flow, such that the operational sensor state can be determined with increased accuracy.

In an embodiment, determining the operational sensor state comprises the control system detecting a deviation of a temporal course of the supply flow, recorded by the control system, and a temporal course of the return flow, having removed the infiltration and exfiltration component by the control system, the deviation being indicative of a malfunctioning of at least one of the first flow sensor and the second flow sensor.

As described above, the supply flow and the return flow of a zone usually relate to each other by a specific ratio if infiltration and exfiltration are absent. In particular, if the air supply to the zone, for example regulated by a fan or by an upstream control valve is constant, the supply flow itself may be essentially stationary. Accordingly, the return flow itself may be essentially stationary in the absence of infiltration and exfiltration, if the air drain out of the zone is constant. Therefore, malfunctioning of the first flow sensor may be deduced from a deviation of an essentially stationary temporal course of the supply flow and, accordingly, a malfunctioning of the second flow sensor from a deviation of an essentially stationary temporal course of the return flow, after having removed infiltration and exfiltration component. The method therefore provides the advantage that while monitoring an air flow in a zone of an HVAC system, the functioning of the sensors of the zone can simultaneously be monitored by using the supply flow and return flow recorded by the control system. This allows to reduce or eliminate the need for additional components or measures to monitor the sensors, increasing cost-effectiveness.

In an embodiment, determining the operational sensor state comprises the control system detecting a continuing decrease of a temporal course of the supply flow recorded by the control system, indicative of a fouling of the first flow sensor measuring the supply flow; and detecting a continuing decrease of a temporal course of the return flow recorded by the control system, indicative of a fouling of the second flow sensor measuring the return flow.

This allows to detect fouling of the first flow sensor and the second flow sensor in a simple manner by exploiting the fact that fouling typically leads to a continuing decrease of the measured flow values.

In an embodiment, the method further comprises arranging at least one additional third sensor for measuring the supply flow or the return flow, the additional third sensor being of a different type than the first flow sensor arranged in the supply port or the second flow sensor arranged in the return port, respectively; and determining the operational sensor state comprises the control system detecting a deviation of a flow measured by the additional third sensor from the supply flow measured by the first flow sensor or the return flow measured by the second flow sensor, respectively.

Arranging at least one additional third sensor, especially of a different type, provides the advantage of redundancy in the measured supply flow or the return flow, which allows to increase the reliability of monitoring the zone of the HVAC system.

In some embodiments, an additional third sensor may be arranged for measuring the supply flow and an additional fourth sensor may be arranged for measuring the return flow, in addition to the first and second flow sensors.

In some embodiments, the third sensor may be a pressure sensor. A pressure sensor may be used in combination with the first and/or second flow sensor for determining the mass flow.

The first flow sensor, second flow sensor and third flow sensor may be selected from at least one of: vane air flow sensor, thermal anemometer such as a hot wire anemometer, differential pressure flow meter etc.

In an embodiment, the method further comprises determining a temperature of at least one of the air flowing through the supply port and the air flowing through the return port using a temperature sensor arranged in the supply port or the return port, respectively; and the control system determining the operational sensor state further using the temperature, of the air flowing through the supply port or the air flowing through the return port, and a characteristic temperature drift parameter of the first flow sensor arranged in the supply port or the second sensor arranged in the return port, respectively.

Arranging a temperature sensor arranged in the supply port or the return port, respectively, provides the advantage that effects from temperature drift modifying the measured supply and return flows, respectively, can be taken into account by the control system. In a variant, a temperature sensor is arranged in each of the supply port and the return port. This may be advantageous if the temperature of the air differs significantly at the supply port and the return port.

According to a further aspect, the present invention is also directed to a control system for monitoring an air flow in a zone of an HVAC system, the zone comprising a supply port and a return port, a first flow sensor configured to measure a supply flow through the supply port and a second flow sensor configured to measure a return flow through the return port, the control system comprising at least one processor configured to record the supply flow measured by the first flow sensor and the return flow measured by the second flow sensor; to determine an infiltration and exfiltration component, using the supply flow and the return flow recorded by the processor; and to determine an operational sensor state of at least one of the first flow sensor and the second sensor, using the supply flow, the return flow, and the infiltration and exfiltration component.

The control system may comprise a computer system connected to the first and second flow sensors via a communication network. Especially, the computer system may be a remote computer system, such as for example a cloud-based computer system, connected to the HVAC system via a communication network, such as the internet. The first and/or second flow sensor may comprise a circuit configured to communicate with the computer system. In some embodiments, the first and/or second flow sensor comprise a sensing unit and an electronic unit. The electronic unit may be configured for readout and/or amplification and/or communication. In some embodiments, the computer system is part of the HVAC system and is connected to the first and second flow sensors via a communication network, such as for example a LAN (Local Area Network) or WLAN (Wireless Local Area Network).

In an embodiment, the processor is further configured to detect the infiltration and exfiltration component in a temporal course of the return flow recorded by the processor, and to determine the operational sensor state by removing the infiltration and exfiltration component from the temporal course of the return flow recorded by the processor.

In an embodiment, the processor is configured to detect a deviation of a temporal course of the supply flow, recorded by the processor, and a temporal course of the return flow, having removed the infiltration and exfiltration component by the processor, the deviation being indicative of a malfunctioning of at least one of the first flow sensor and the second flow sensor.

In an embodiment, the processor is configured to determine the operational sensor state by detecting a continuing decrease of a temporal course of the supply flow recorded by the processor, indicative of a fouling of the first flow sensor measuring the supply flow, and detecting a continuing decrease of a temporal course of the return flow recorded by the processor, indicative of a fouling of the second flow sensor measuring the return flow.

In an embodiment, the processor is further configured to record the supply flow or the return flow, measured by at least one additional third sensor, the additional third sensor being of a different type than the first flow sensor arranged in the supply port or the second flow sensor arranged in the return port, respectively; and to determine the operational sensor state by detecting a deviation of a flow measured by the additional third sensor from the supply flow measured by the first flow sensor or the return flow measured by the second flow sensor, respectively.

In an embodiment, the processor is further configured to record a temperature of at least one of the air flowing through the supply port and the air flowing through the return port, measured by a temperature sensor arranged in the supply port or the return port, respectively; and to determine the operational sensor state further using the temperature, of the air flowing through the supply port or the air flowing through the return port, and a characteristic temperature drift parameter of the first flow sensor arranged in the supply port or the second flow sensor arranged in the return port, respectively.

According to a further aspect, the present invention is also directed to a computer program product comprising a non-transitory computer-readable medium having stored thereon computer program code configured to control a processor of a control system for monitoring an air flow in a zone of an HVAC system, the zone comprising a supply port and a return port, a first flow sensor configured to measure a supply flow through the supply port, and a second flow sensor configured to measure a return flow through the return port, the computer program code being configured to control the processor, such that the processor performs the steps of: recording the supply flow measured by the first flow sensor and the return flow measured by the second flow sensor; determining an infiltration and exfiltration component, using the supply flow and the return flow recorded by the processor; and determining an operational sensor state of at least one of the first flow sensor and the second flow sensor, using the supply flow, the return flow, and the infiltration and exfiltration component.

In an embodiment, the computer program code is further configured to control the processor to detect the infiltration and exfiltration component in a temporal course of the return flow recorded by the control system; and to determine the operational sensor state by removing the infiltration and exfiltration component from the temporal course of the return flow recorded by the processor.

In an embodiment, the computer program code is further configured to control the processor to determine the operational sensor state by detecting a continuing decrease of a temporal course of the supply flow recorded by the processor, indicative of a fouling of the first flow sensor measuring the supply flow; and detecting a continuing decrease of a temporal course of the return flow recorded by the processor, indicative of a fouling of the second flow sensor measuring the return flow.

BRIEF DESCRIPTION OF THE DRAWINGS

The present invention will be explained in more detail, by way of example, with reference to the drawings, in which.

DETAILED DESCRIPTION OF EXEMPLARY EMBODIMENTS

Figure 1:
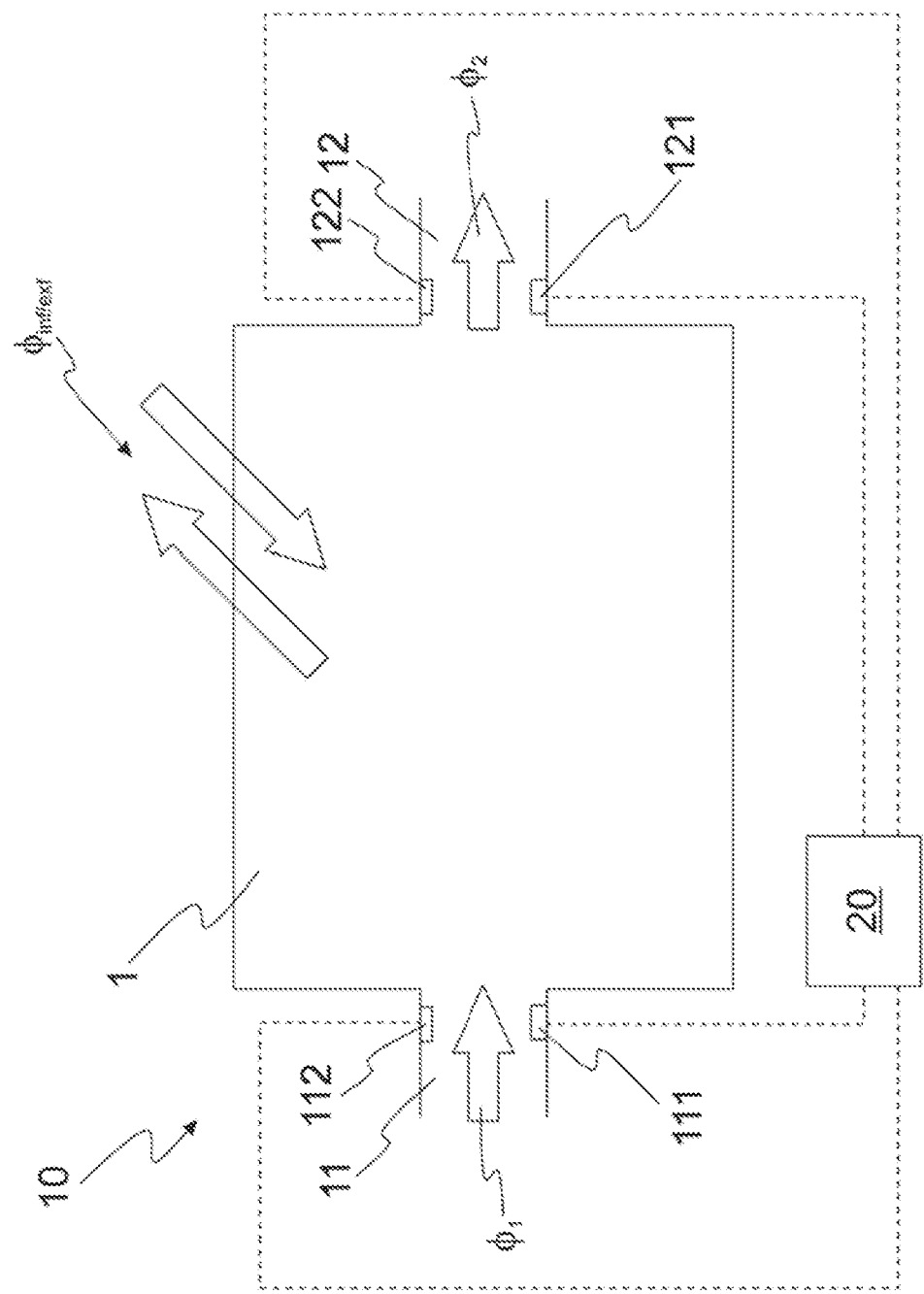
FIG. 1: shows a schematic illustration of a zone of an HVAC system.

FIG. 1 shows a schematic illustration of a zone 1 of an HVAC system 10. The zone 1 comprises a supply port 11 and a return port 12. A first flow sensor 111 is arranged in the supply port 11 and a second flow sensor 121 is arranged in the return port 12. The first flow sensor 111 is configured to measure a supply flow $\phi_1$ and the second flow sensor 121 is configured to measure a return flow $\phi_2$. The first flow sensor 111 and the second flow sensor 121 can be for example a vane air flow sensor, a thermal anemometer such as a hot wire anemometer, a differential pressure flow meter etc. As illustrated in FIG. 1, a control system 20 is connected to the first flow sensor 111 and the second flow sensor 121, as symbolized by the dashed lines. The control system 20 comprises one or more computers which comprise one or more processors configured to perform various functions as described later in connection with FIGS. 2 to 5. The air flow in the zone further comprises an infiltration and exfiltration flow $\phi_{inf/exf}$, as symbolized by the diagonal arrows. The infiltration and exfiltration flow $\phi_{inf/exf}$ may originate from leakage, such as imperfect sealing at windows etc. Typically, the infiltration and exfiltration flow $\phi_{inf/exf}$ is an essentially steady flow occurring over a comparably large time scale, such as days or weeks. However, infiltration and exfiltration flow may also occur on short time scales, for example due to window and/or door opening etc. Infiltration and exfiltration occurring on short time scales may also occur in a repeated fashion, for example if windows are opened and closed regularly. From FIG. 1, it can be recognized that the supply flow $\phi_1$, should be equal to the return flow $\phi_2$ in the absence of any infiltration and exfiltration. Thus, a ratio $\phi_1/\phi_2$ of the supply flow $\phi_1$ to the return flow $\phi_2$ deviating from unity can be indicative of infiltration and/or exfiltration being present.

FIG. 1 further shows a third flow sensor 122 arranged in the return port 12 of the zone 1. The third sensor 122 may be of different type than the second flow sensor 121. For example, the second flow sensor 121 may be a hot wire anemometer, and the third sensor 122 may be a thin-film mass flow sensor or a pressure sensor. The third sensor 122 provides a redundancy of the measured return flow $\phi_2$, which increases the reliability of the recorded flow values. In particular, determining the operational sensor state may comprise the control system 20 detecting a deviation of a flow measured by the third sensor 122 from the return flow $\phi_2$ measured by the second flow sensor 121. The third sensor 122 is connected with the control system 20, as symbolized by a dashed line. Alternatively or in addition, a third sensor could be arranged in the supply port 11.

In the supply port 11, there is arranged a temperature sensor 112 configured to measure the temperature of the air flowing through the supply port 11. Using the temperature sensor 112, effects from temperature drift modifying the measured supply flow $\phi_1$ can be taken into account by the control system 20, to which the temperature sensor 112 is connected, as symbolized by the dashed line. Alternatively or in addition, a temperature sensor could be arranged in the return port 12.

In particular, the measurement of the supply flow $\phi_1$ by the first flow sensor 111 or the return flow $\phi_2$ by the second flow sensor 121, respectively, may be temperature dependent. The temperature dependence is incorporated into a characteristic temperature drift parameter for the first flow sensor 111 or the second flow sensor 121, respectively. The temperature drift parameter depends on the actual temperature of the air flowing through the supply port 11 or the return port 12, respectively. Using the temperature measured by the temperature sensor 112 allows to evaluate the temperature drift parameter at the measured temperature and to use the temperature drift parameter for determining the operational sensor state. For example, if the measurement signal of the first flow sensor 111 or the second flow sensor 121 is known to decrease with increasing temperature, the decreasing can be expressed by the temperature drift parameter. Accordingly, the measured signal can be offset in order to take into account the temperature drift, using the temperature drift parameter at the temperature measured by the temperature sensor 112.

Figure 2:
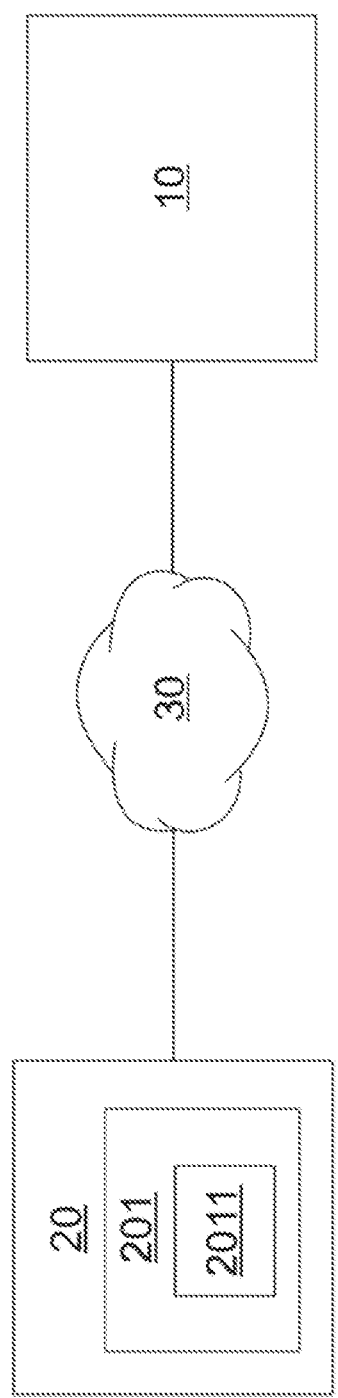
FIG. 2: shows a schematic illustration of a remote control system that is connected to an HVAC system via a communication network.

FIG. 2 shows a schematic illustration of a remote control system 20 that is connected to an HVAC system 10 via a communication network 30. The remote control system 20 comprises one or more computers 201 which comprise one or more processors 2011 configured to perform the steps of recording the supply flow measured by the first flow sensor 111 and the second flow sensor 121, determining an infiltration and exfiltration component $\phi_{inf/exf}$ using the supply flow $\phi_1$ and the return flow $\phi_2$ recorded by the processor 2011, and determining an operational sensor state of the first flow sensor 111 and the second flow sensor 121, using the supply flow $\phi_1$, the return flow $\phi_2$, and the infiltration and exfiltration component $\phi_{inf/exf}$. In particular, the one or more processors 2011 of the control system 20 may have a computer program code configured to control the processor 2011 of the control system 20 to perform the aforementioned steps of monitoring the air flow in the zone 1 of the HVAC system 10. In an embodiment, the remote control system 20 is implemented as a cloud-based computer system that is connected to the HVAC system 10 via the internet. In particular, the first and second sensors 111, 121 of a zone 1 of the HVAC system 10 may comprise circuits configured to communicate with the remote control system 20 via the communication network 30. The measured supply flow $\phi_1$ and return flow $\phi_2$ are transmitted to the remote control system 20 via the communication network 30 and can be monitored by the remote control system 20 for determining for example infiltration and exfiltration components $\phi_{inf/exf}$ and/or operational sensor states. The remote control system 20 can furthermore be used in a centralized control system to monitor the air flow in several different zones 1 of the HVAC system 10. The operational sensor states, especially fouling of the flow sensors 111, 121, can therefore be determined remotely by the control system 20 using the supply flow $\phi_1$ and return flow $\phi_2$ as well as infiltration and exfiltration components $\phi_{inf/exf}$.

Figure 3:
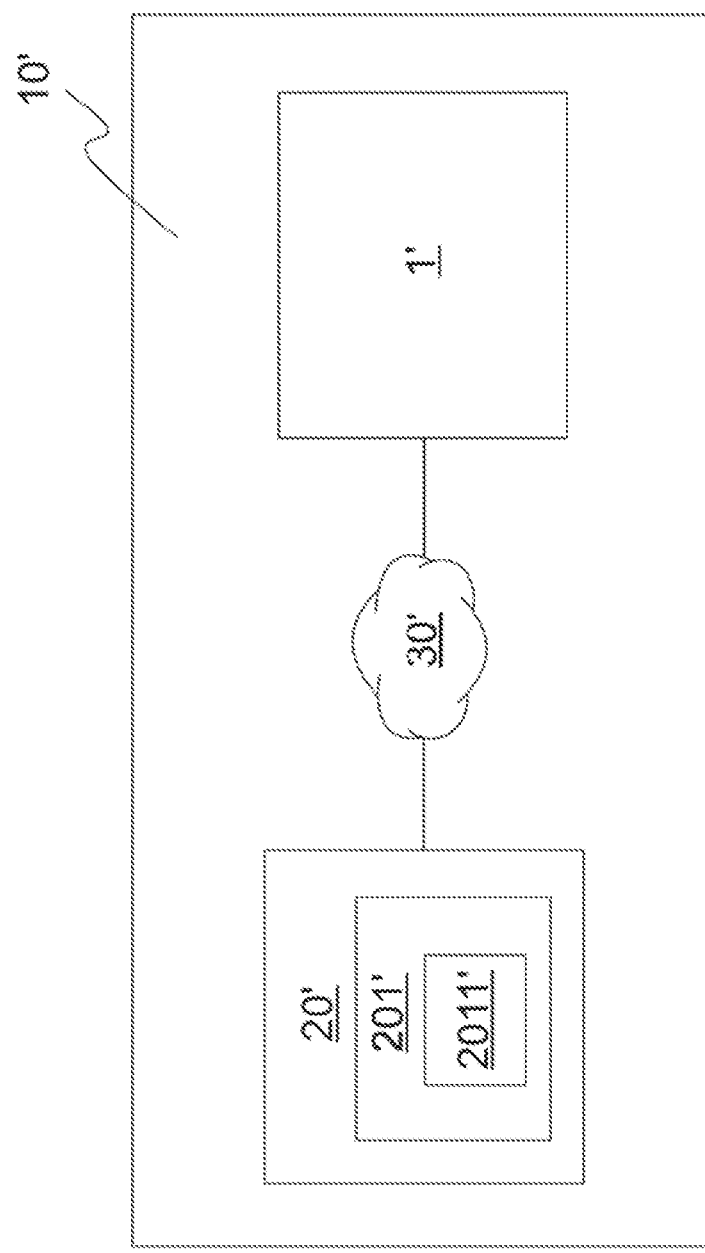
FIG. 3: shows a schematic illustration of an HVAC system comprising a control system that is connected to a zone of the HVAC system.

In some embodiments, the control system 20' is part of an HVAC system 10' as shown in FIG. 3. In contrast to the embodiment of FIG. 2, the control system 20' is thus a local control system 20' of the HVAC system 10'. The control system 20' comprises one or more computers 201' which comprise one or more processors 2011' configured to perform the steps as described in connection to the control system 20 of FIG. 2. In particular, the one or more processors 2011' of the control system 20' may have a computer program code configured to control the processor 2011' of the control system 20' to perform the aforementioned steps of monitoring the air flow in the zone 1' of the HVAC system 10'. The control system 20' is connected to the zone of the HVAC system 10' via a communication network 30', such as a LAN or WLAN. In particular, the first and second sensors 111, 121 of the zone 1' may comprise circuits configured to communicate with the computer system 20' via the communication network 30'.

Figure 4:
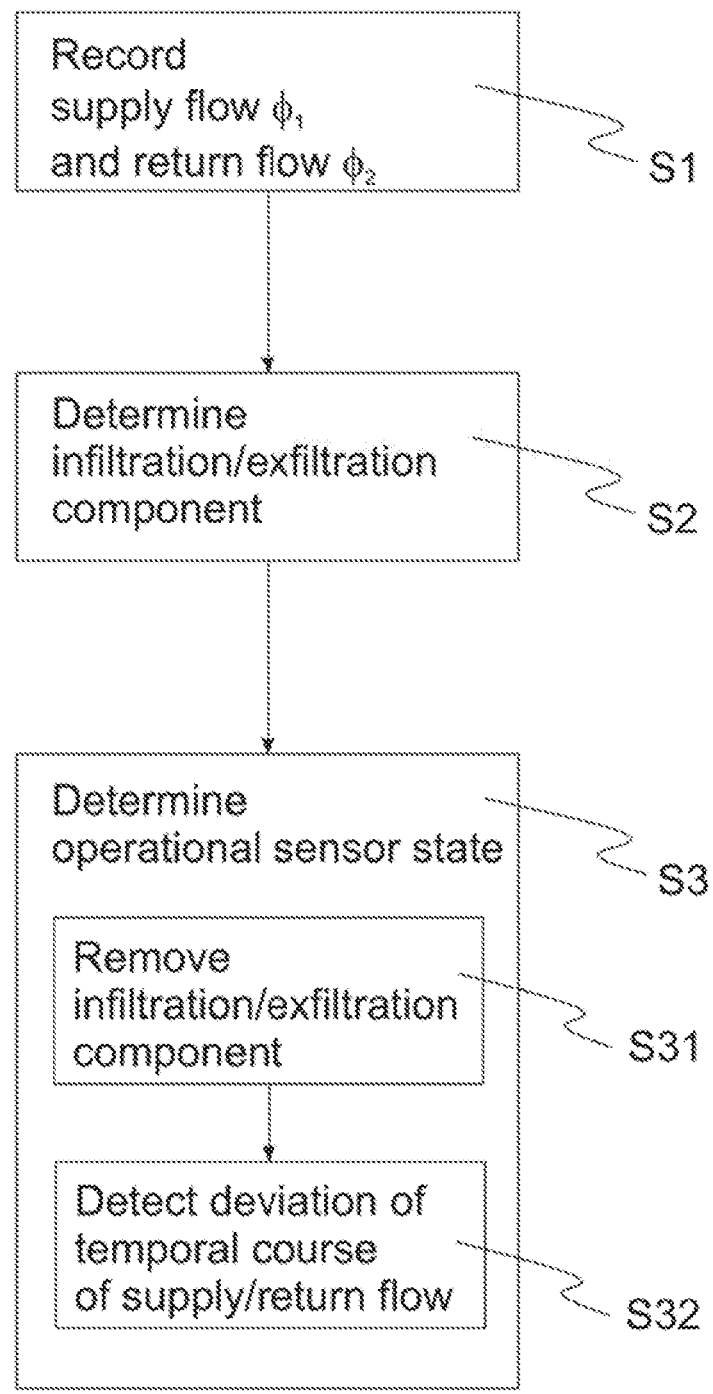
FIG. 4: shows a flow diagram illustrating an exemplary sequence of steps of recording a supply flow and a return flow, determining an infiltration and exfiltration component and determining an operational sensor state.

FIG. 4 shows a flow diagram illustrating an exemplary sequence of steps for monitoring an air flow in the zone 1, 1' of the HVAC system 10, 10'; more specifically, an exemplary sequence of steps for recording a supply flow $\phi_1$ and a return flow $\phi_2$, determining an infiltration and exfiltration component $\phi_{inf/exf}$ and determining an operational sensor state.

In step S1, the control system 20, 20' or its processor(s) 2011, 2011', respectively, records a supply flow $\phi_1$ measured by the first flow sensor 111 of the zone 1, 1' and a return flow $\phi_2$ measured by the second flow sensor 121 of the zone 1, 1'.

In step S2, the control system 20, 20' or its processor(s) 2011, 2011', respectively, determines an infiltration and exfiltration component inf/exf using the recorded supply flow $\phi_1$ and the return flow $\phi_2$, for example in a temporal course of the recorded return flow $\phi_2$. In the absence of any or for negligible infiltration and exfiltration, the supply flow $\Phi_1$ as measured by the first flow sensor 111 and the return flow $\phi_2$ as measured by the second flow sensor 121 are equal, except for opposite signs, provided the first flow sensor 111 and the second flow sensor 121 operate ideally. Thus, the recorded supply flow $\phi_1$ and the return flow $\phi_2$ not being equal may be indicative of infiltration and exfiltration being present, such that the control system 20, 20' may determine an infiltration and exfiltration component $\phi_{inf/exf}$ from the difference between the supply flow $\phi_1$ and the return flow $\phi_2$. Especially, in case of a non-zero infiltration and exfiltration $\phi_{inf/exf}$, the return flow $\phi_2$ may deviate from the original return flow $\phi_2$ in the absence of infiltration and exfiltration. Furthermore, parameters such as air supply to the zone, for example regulated by a fan or by an upstream control valve or a downstream control valve may have an influence on the recorded supply flow $\phi_1$ and the recorded return flow $\phi_1$, respectively. However, said parameters are usually known and can be taken into account by the control system 20, 20' accordingly.

Typically, infiltration and exfiltration may occur on a long time scale, such as days or weeks, for example due to a continuing leakage through a non-ideal sealing.

In some situations, infiltration and exfiltration may occur over a comparatively short time scale, such as minutes or hours, for example when a window is opened and/or closed. Infiltration and exfiltration may thereby be expressed in fluctuations in the temporal course of the return flow $\phi_2$, which can be detected by the second flow sensor 121.

In step S3, the control system 20, 20' or its processor(s) 2011, 2011', respectively, further determines the operational sensor state of the first flow sensor 111 and/or the second flow sensor 121 by executing the following steps S31 and S32.

In step S31, the control system 20, 20' or its processor(s) 2011, 2011', respectively, removes the infiltration and exfiltration component $\phi_{inf/exf}$ from the temporal course of the recorded return flow $\phi_2$. The infiltration and exfiltration component $\phi_{inf/exf}$ may be removed from the temporal course of the recorded return flow $\phi_2$ by offsetting the recorded return flow $\phi_2$, as will be described in connection with FIG. 5. For infiltration and exfiltration occurring on a short time scale or repeatedly, the infiltration and exfiltration component $\phi_{inf/exf}$ may be removed by applying a filter function, such as a low-pass filter or a band-pass filter, to the recorded return flow $\phi_2$.

In step S32, the control system 20, 20' or its processor(s) 2011, 2011', respectively, detects a deviation of a temporal course of the recorded supply flow $\phi_1$ and/or a temporal course of the return flow $\phi_2$ having removed the infiltration and exfiltration component $\phi_{inf,exf}$. The deviation as detected by the control system 20, 20' may then be indicative of a malfunctioning of the first flow sensor 111 and/or the second flow sensor 121, for example due to fouling. For example, the control system 20, 20' may detect a continuing decrease, i.e. a deviation from a steady state, of the temporal course of the supply flow $\phi_1$ and/or the return flow $\phi_2$, which may originate from the first flow sensor 111 and/or the second flow sensor 121 being fouled which continuously decreases the measured flow signal.

Figure 5:
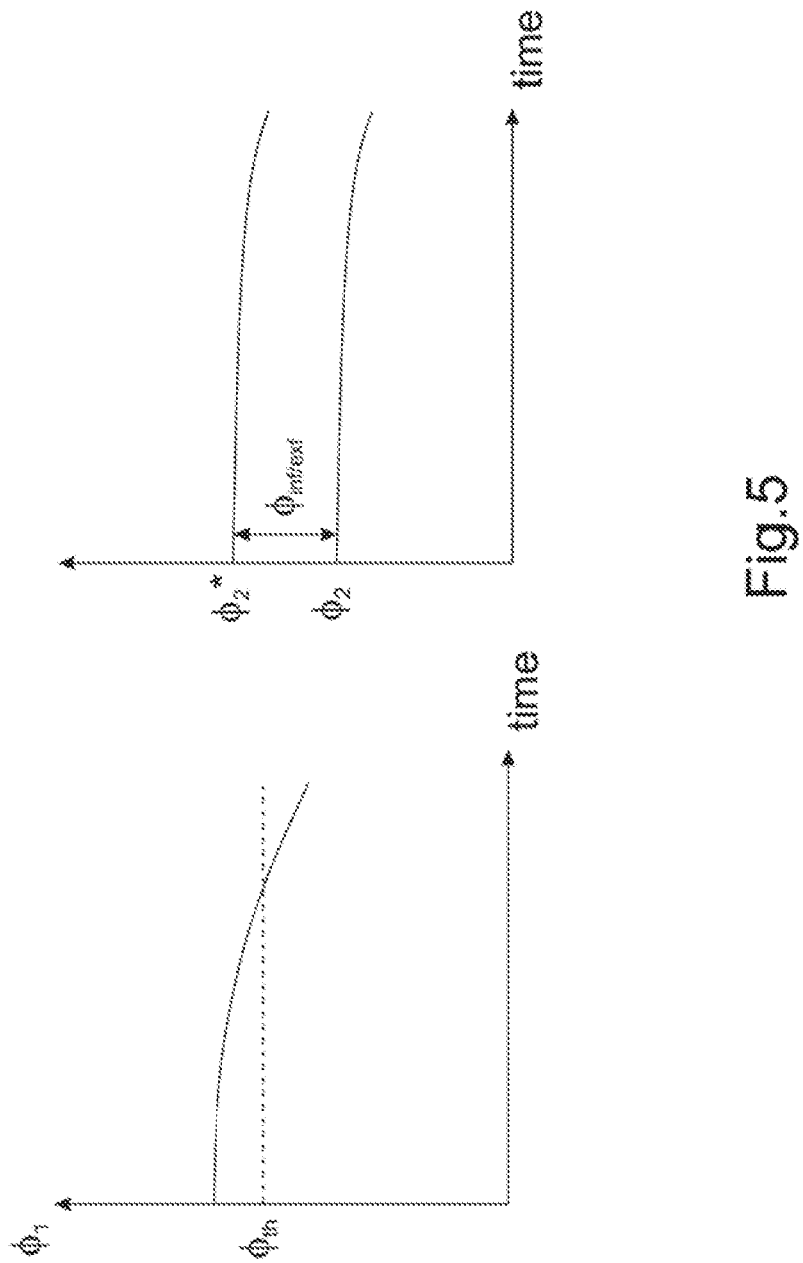
FIG. 5: shows graphs illustrating the temporal course of the supply flow and the temporal course of the return flow.

FIG. 5 shows graphs illustrating the temporal course of the supply flow $\phi_1$ and the temporal course of the return flow $\phi_2$, respectively, for a zone 1 as shown in FIG. 1. The return flow $\phi_2$ is the return flow $\phi_2$ as measured by the second flow sensor 121 arranged at the return port of the zone 1. By comparing the return flow $\phi_2$ as measured by the second flow sensor 121 with the supply flow $\phi_1$ as measured by the first flow sensor 111, an infiltration and exfiltration component $\phi_{inf,exf}$ can be determined and removed from the temporal course of the return flow $\phi_2$, resulting in the corrected return flow $\phi_2^*$. In the example as shown in FIG. 5, the recorded return flow $\phi_2$ is smaller than the supply flow $\phi_1$ by an amount which corresponds to the infiltration and exfiltration component $\phi_{inf,exf}$. The corrected return flow $\phi_2^*$ is therefore obtained by offsetting the recorded return flow $\phi_2$ by the infiltration and exfiltration component $\phi_{inf,exf}$. As can be seen in the graphs, both the supply flow $\phi_1$ and the corrected return flow $\phi_2^*$ show deviations in the temporal course from a steady state in that both the supply flow $\phi_1$ and the corrected return flow $\phi_2^*$ are slowly, but continuously decreasing in time, indicating a malfunctioning of both the first flow sensor 111 and the second flow sensor 121, such as fouling. In an embodiment, the control system 20, 20' may define a threshold value $\phi_{th}$ of for example 80% of an original flow value below which a malfunctioning of the first flow sensor 111 and/or the second flow sensor 121 shall be considered to be unacceptable. In FIG. 5, the threshold value $\phi_{th}$ is indicated by the dashed line in the left graph for the supply flow $\phi_1$. The control system 20, 20' may comprise an alarm unit which indicates a malfunctioning of the first flow sensor 111 or the second flow sensor 121, if the supply flow $\phi_1$ or the return flow $\phi_2$ falls below the threshold value. In some embodiments, separate threshold values may be defined for the first flow sensor 111 and the second flow sensor 121, respectively.

LIST OF REFERENCE SYMBOLS 10, 10' HVAC system
1,1' zone
11 supply port
111 in first flow sensor
112 temperature sensor
12 return port
121 second flow sensor
122 third sensor
$\phi_1$ supply flow
$\phi_2$ return flow
$\phi_2^*$ corrected return flow
$\phi_{inf,exf}$ infiltration and exfiltration flow/component
$\phi_1$ threshold value
20, 20' control system
201, 201' computer system
2011, 2011' processor
30, 30' communication network

The invention claimed is:

1. A method of monitoring an air flow in a zone of an HVAC system, the zone comprising a supply port and a return port, a first flow sensor configured to measure a supply flow through the supply port, and a second flow sensor configured to measure a return flow through the return port, the method comprising:
   recording by a control system the supply flow measured by the first flow sensor and the return flow measured by the second flow sensor;
   determining by the control system an infiltration and exfiltration component, using the supply flow and the return flow recorded by the control system;
   determining by the control system an operational sensor state of at least one of the first flow sensor and the second flow sensor, using the supply flow, the return flow, and the infiltration and exfiltration component; and
   generating, by the control system, one or more alarms indicating the malfunctioning of the at least one of the first or second flow sensors based on the determined operational sensor state,
   wherein determining the operational sensor state comprises the control system detecting a deviation of a temporal course of the supply flow, recorded by the control system, and a temporal course of the return flow, having removed the infiltration and exfiltration component by the control system, the deviation being indicative of a malfunctioning of at least one of the first flow sensor and the second flow sensor.

2. The method of claim 1, wherein determining the infiltration and exfiltration component comprises the control system detecting the infiltration and exfiltration component in a temporal course of the return flow recorded by the control system; and determining the operational sensor state comprises the control system removing the infiltration and exfiltration component from the temporal course of the return flow recorded by the control system.

3. The method of claim 1, wherein determining the operational sensor state comprises the control system detecting a continuing decrease of a temporal course of the supply flow recorded by the control system, indicative of a fouling of the first flow sensor measuring the supply flow; and detecting a continuing decrease of a temporal course of the return flow recorded by the control system, indicative of a fouling of the second flow sensor measuring the return flow.

4. The method of claim 1, wherein the method further comprises arranging at least one additional third sensor for measuring the supply flow or the return flow, the additional third sensor being of a different type than the first flow sensor arranged in the supply port or the second flow sensor arranged in the return port, respectively; and determining the operational sensor state comprises the control system detecting a deviation of a flow measured by the additional third sensor from the supply flow measured by the first flow sensor or the return flow measured by the second flow sensor, respectively.

5. The method of claim 1, wherein the method further comprises determining a temperature of at least one of the air flowing through the supply port and the air flowing through the return port using a temperature sensor arranged in the supply port or the return port, respectively; and the control system determining the operational sensor state further using the temperature, of the air flowing through the supply port or the air flowing through the return port, and a characteristic temperature drift parameter of the first flow sensor arranged in the supply port or the second flow sensor arranged in the return port, respectively.

6. A control system for monitoring an air flow in a zone of an HVAC system, the zone comprising a supply port and a return port, a first flow sensor configured to measure a supply flow through the supply port and a second flow sensor configured to measure a return flow through the return port, the control system comprising at least one processor configured to at least:
  record the supply flow measured by the first flow sensor and the return flow measured by the second flow sensor;
  determine an infiltration and exfiltration component, using the supply flow and the return flow recorded by the processor;
  determine an operational sensor state of at least one of the first flow sensor and the second flow sensor, using the supply flow, the return flow, and the infiltration and exfiltration component by detecting a deviation of a temporal course of the supply flow, recorded by the processor, and a temporal course of the return flow, having removed the infiltration and exfiltration component by the processor, the deviation being indicative of a malfunctioning of at least one of the first flow sensor and the second flow sensor; and
  generate one or more alarms indicating the malfunctioning of the at least one of the first or second flow sensors based on the determined operational sensor state.

7. The control system of claim 6, wherein the processor is further configured to detect the infiltration and exfiltration component in a temporal course of the return flow recorded by the processor, and to determine the operational sensor state by removing the infiltration and exfiltration component from the temporal course of the return flow recorded by the processor.

8. The control system of claim 6, wherein the processor is configured to determine the operational sensor state by detecting a continuing decrease of a temporal course of the supply flow recorded by the processor, indicative of a fouling of the first flow sensor measuring the supply flow, and detecting a continuing decrease of a temporal course of the return flow recorded by the processor, indicative of a fouling of the second flow sensor measuring the return flow.

9. The control system of claim 6, wherein the processor is further configured to record the supply flow or the return flow, measured by at least one additional third sensor, the additional third sensor being of a different type than the first flow sensor arranged in the supply port or the second flow sensor arranged in the return port, respectively; and to determine the operational sensor state by detecting a deviation of a flow measured by the additional third sensor from the supply flow measured by the first flow sensor or the return flow measured by the second flow sensor, respectively.

10. The control system of claim 6, wherein the processor is further configured to record a temperature of at least one of the air flowing through the supply port and the air flowing through the return port, measured by a temperature sensor arranged in the supply port or the return port, respectively; and to determine the operational sensor state further using the temperature of the air flowing through the supply port or the air flowing through the return port, and a characteristic temperature drift parameter of the first flow sensor arranged in the supply port or the second flow sensor arranged in the return port, respectively.

11. A non-transitory computer-readable medium having stored thereon computer program code configured to control a processor of a control system for monitoring an air flow in a zone of an HVAC system, the zone comprising a supply port and a return port, a first flow sensor configured to measure a supply flow through the supply port, and a second flow sensor configured to measure a return flow through the return port, the computer program code, when accessed and executed by the processor, causes the processor to perform the steps of at least:
  recording the supply flow measured by the first flow sensor and the return flow measured by the second flow sensor;
  determining an infiltration and exfiltration component, using the supply flow and the return flow recorded by the processor;
  determining an operational sensor state of at least one of the first flow sensor and the second flow sensor, using the supply flow, the return flow, and the infiltration and exfiltration component by detecting a deviation of a temporal course of the supply flow, recorded by the processor, and a temporal course of the return flow, having removed the infiltration and exfiltration component by the processor, the deviation being indicative of a malfunctioning of at least one of the first flow sensor and the second flow sensor; and
  generate one or more alarms indicating the malfunctioning of the at least one of the first or second flow sensors based on the determined operational sensor state.

12. The computer program product of claim 11, wherein the computer program code further causes the processor, to detect the infiltration and exfiltration component in a temporal course of the return flow recorded by the control system; and to determine the operational sensor state by removing the infiltration and exfiltration component from the temporal course of the return flow recorded by the processor.

13. The computer program product of claim 11, wherein the computer program code further causes the processor to determine the operational sensor state by detecting a continuing decrease of a temporal course of the supply flow recorded by the processor, indicative of a fouling of the first flow sensor measuring the supply flow; and detecting a continuing decrease of a temporal course of the return flow recorded by the processor, indicative of a fouling of the second flow sensor measuring the return flow.

* * * * *